United States Patent
Tokatyan et al.

(10) Patent No.: US 10,311,314 B2
(45) Date of Patent: Jun. 4, 2019

(54) DETECTION OF LANE-SPLITTING MOTORCYCLES

(71) Applicant: Ford Global Technologies, LLC, Dearborn, MI (US)

(72) Inventors: Shant Tokatyan, Foster City, CA (US); Shounak Athavale, San Jose, CA (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 187 days.

(21) Appl. No.: 15/360,856

(22) Filed: Nov. 23, 2016

(65) Prior Publication Data
US 2018/0144200 A1    May 24, 2018

(51) Int. Cl.
| | |
|---|---|
| *G06K 9/00* | (2006.01) |
| *B60Q 5/00* | (2006.01) |
| *B60R 1/00* | (2006.01) |
| *G05D 1/02* | (2006.01) |
| *G06K 9/46* | (2006.01) |
| *G06K 9/62* | (2006.01) |

(Continued)

(52) U.S. Cl.
CPC ......... *G06K 9/00805* (2013.01); *B60Q 5/006* (2013.01); *B60Q 9/008* (2013.01); *B60R 1/00* (2013.01); *G05D 1/0246* (2013.01); *G06K 9/4647* (2013.01); *G06K 9/6215* (2013.01); *H04N 7/183* (2013.01); *B60R 2300/30* (2013.01); *B60R 2300/301* (2013.01); *B60R 2300/8066* (2013.01); *B60R 2300/8093* (2013.01)

(58) Field of Classification Search
CPC ............. G06K 9/00805; G06K 9/4647; G06K 9/6215; B60Q 5/006; B60Q 9/008; B60R 1/00; B60R 2300/301; B60R 2300/8066; B60R 2300/8093; G05D 1/0246; H04N 7/183

See application file for complete search history.

(56) References Cited

U.S. PATENT DOCUMENTS

| | | | |
|---|---|---|---|
| 6,184,781 B1 | 2/2001 | Ramakesavan | |
| 7,027,054 B1 * | 4/2006 | Cheiky | .................. G06T 13/40 |
| | | | 345/473 |
| 7,596,242 B2 | 9/2009 | Breed | |

(Continued)

FOREIGN PATENT DOCUMENTS

| | | |
|---|---|---|
| DE | 102013001332 | 7/2014 |
| JP | H0973529 A | 3/1997 |
| JP | 2000020686 A | 1/2000 |

*Primary Examiner* — Shefali D Goradia
(74) *Attorney, Agent, or Firm* — David R. Stevens; Stevens Law Group

(57) ABSTRACT

A controller receives images from a rearward-facing camera having an inter-lane region in the field of view thereof. A region of interest of the images is identified corresponding to the inter-lane region. The region of interest is converted to a grayscale image having a drastically reduced number of intensity levels. A difference image is determined between the grayscale image for each image relative to the grayscale image of a preceding image. If the non-zero pixels in the difference image exceed a threshold and the area of non-zero pixels in the difference images for the input images are increasing with time, a lane-splitting vehicle will be determined to be present and an alert may be generated and/or autonomous lane changes may be suppressed.

20 Claims, 6 Drawing Sheets

(51) Int. Cl.
   *H04N 7/18*     (2006.01)
   *B60Q 9/00*     (2006.01)

(56)    References Cited

U.S. PATENT DOCUMENTS

| | | | |
|---|---|---|---|
| 8,098,302 B2 | 1/2012 | Fukuda | |
| 8,611,598 B2* | 12/2013 | Yankun | G06K 9/00805 |
| | | | 382/103 |
| 8,933,797 B2 | 1/2015 | Deigmoller | |
| 9,488,982 B2 | 11/2016 | Gurin | |
| 9,734,572 B2* | 8/2017 | Tien | G06T 7/001 |
| 2001/0002936 A1 | 6/2001 | Tsuji | |
| 2003/0137593 A1 | 7/2003 | Watanabe | |
| 2003/0138133 A1 | 7/2003 | Nagaoka | |
| 2010/0124074 A1* | 5/2010 | Brychell | G02B 6/006 |
| | | | 362/604 |
| 2014/0002658 A1 | 1/2014 | Kim | |
| 2014/0133736 A1* | 5/2014 | Tien | G06T 7/001 |
| | | | 382/149 |
| 2015/0116315 A1 | 4/2015 | Takemoto | |
| 2015/0199619 A1 | 7/2015 | Ichinose | |
| 2016/0140392 A1 | 5/2016 | Gurbuz | |
| 2016/0332535 A1 | 11/2016 | Bradley | |
| 2017/0210353 A1 | 7/2017 | Stauffer | |
| 2018/0112173 A1 | 4/2018 | Wiles | |

\* cited by examiner

DETECTION OF LANE-SPLITTING MOTORCYCLES

BACKGROUND

Field of the Invention

This invention relates to performing obstacle detection, such as for use in autonomous vehicles.

Background of the Invention

In many congested, urban areas like San Francisco, Calif. or London, UK, motorcyclists often overtake slow or stopped vehicles in the traffic by traveling between lanes, namely lane-splitting. This is a very dangerous driving activity since it is hard for drivers in adjacent vehicles to detect such activities, especially when lanes are merging. Even for future autonomous vehicles, which might have built-in 360 degree sensing systems, it would be challenging to identify fast moving objects like motorcycles changing lanes at much higher relative speeds. This difficulty would hence present challenges to the overall sensing suites and algorithms. It is further problematic where objects or vehicles occlude a sensing system.

The systems and methods disclosed herein provide an improved approach for sensing motorcyclists or other vehicles that are lane-splitting.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
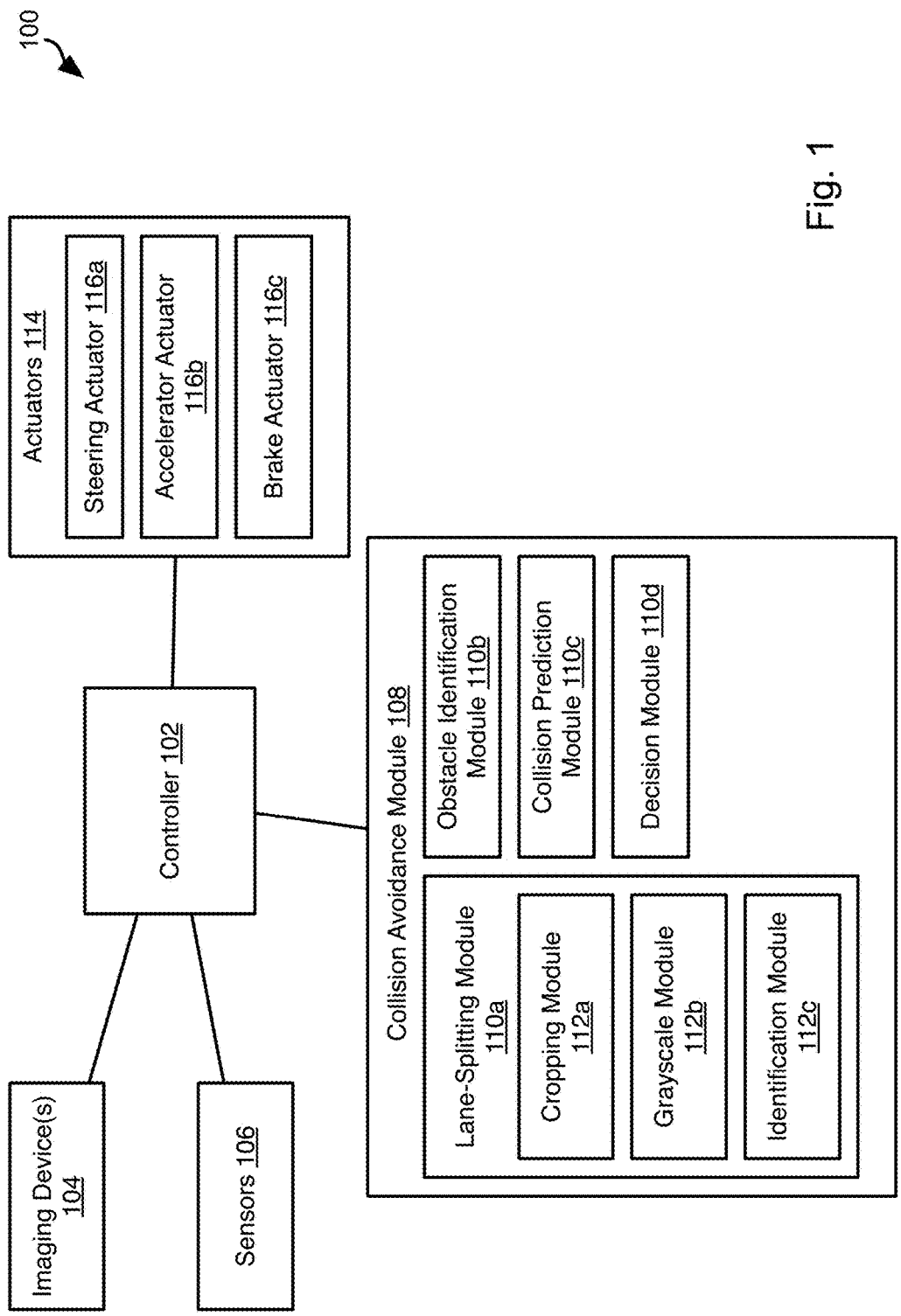
FIG. 1 is a schematic block diagram of a system for implementing embodiments of the invention.

Referring to FIG. 1, a system 100 may include a controller 102 housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. In particular, image data and/or other sensor data may be analyzed to identify vehicles that may be lane-splitting as discussed in greater detail below with respect to FIGS. 3 through 6C.

The controller 102 may receive one or more image streams from one or more imaging devices 104. For example, one or more cameras may be mounted to the vehicle and output image streams received by the controller 102. The controller 102 may receive one or more data streams from one or more sensors 106. For example, the controller may be coupled to one or more other sensors 106 that are mounted to the vehicle. The sensors may include RADAR, LIDAR, SONAR, and the like.

A collision avoidance module 108 may include a lane-splitting module 110a. The lane-splitting module 110a may include a cropping module 112a that extracts a region of interest in images received from the imaging devices 104. The lane-splitting module 110a may include a grayscale module 112b that processes images or the region of interest of images from the imaging devices 104 into a simplified form. The lane-splitting module 110a may include an identification module 112c that identifies potential lane-splitting vehicles in the simplified images output by the grayscale module 112b. The operation of the lane-splitting module 110a is described in greater detail below with respect to FIGS. 3 through 6C.

The collision avoidance module 108 may further include an obstacle identification module 110b, a collision prediction module 110c, and a decision module 110d. The obstacle identification module 110b analyzes the one or more image streams and identifies potential obstacles, including people, animals, vehicles, buildings, curbs, and other objects and structures. In particular, the obstacle identification module 110b may identify vehicle images in the image stream.

The collision prediction module 110c predicts which obstacle images are likely to collide with the vehicle based on its current trajectory or current intended path. The decision module 110d may make a decision to stop, accelerate, turn, etc. in order to avoid obstacles. The manner in which the collision prediction module 110c predicts potential collisions and the manner in which the decision module 110d takes action to avoid potential collisions may be according to any method or system known in the art of autonomous vehicles.

The decision module 110d may control the trajectory of the vehicle by actuating one or more actuators 114 controlling the direction and speed of the vehicle. For example, the actuators 114 may include a steering actuator 116a, an accelerator actuator 116b, and a brake actuator 116c. The configuration of the actuators 116a-116c may be according to any implementation of such actuators known in the art of autonomous vehicles.

Note that although the methods described herein are described for use in an autonomous vehicle, a human-driven vehicle may still benefit from the identification of lane-splitting vehicles as described herein.

Figure 2:
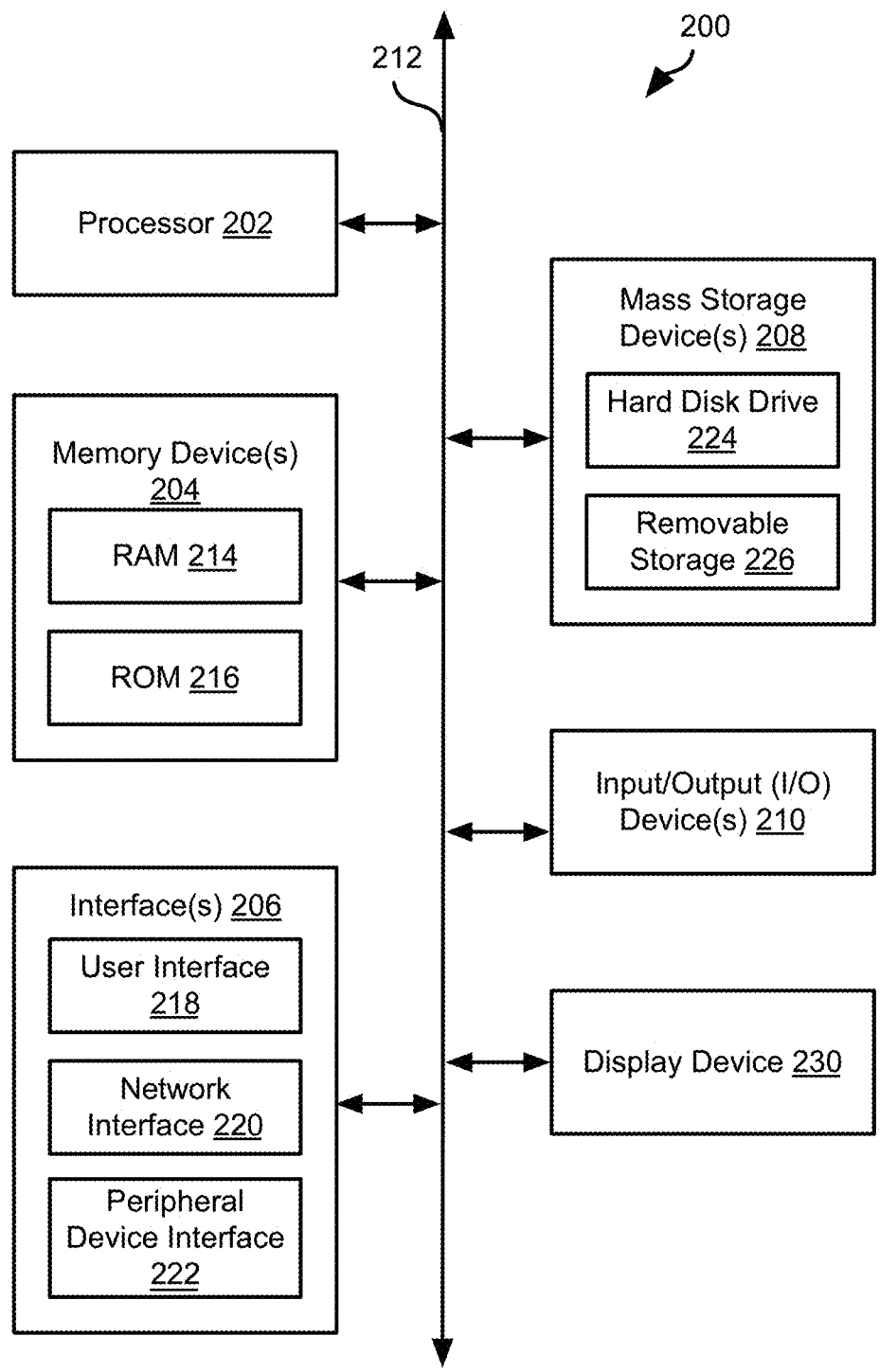
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
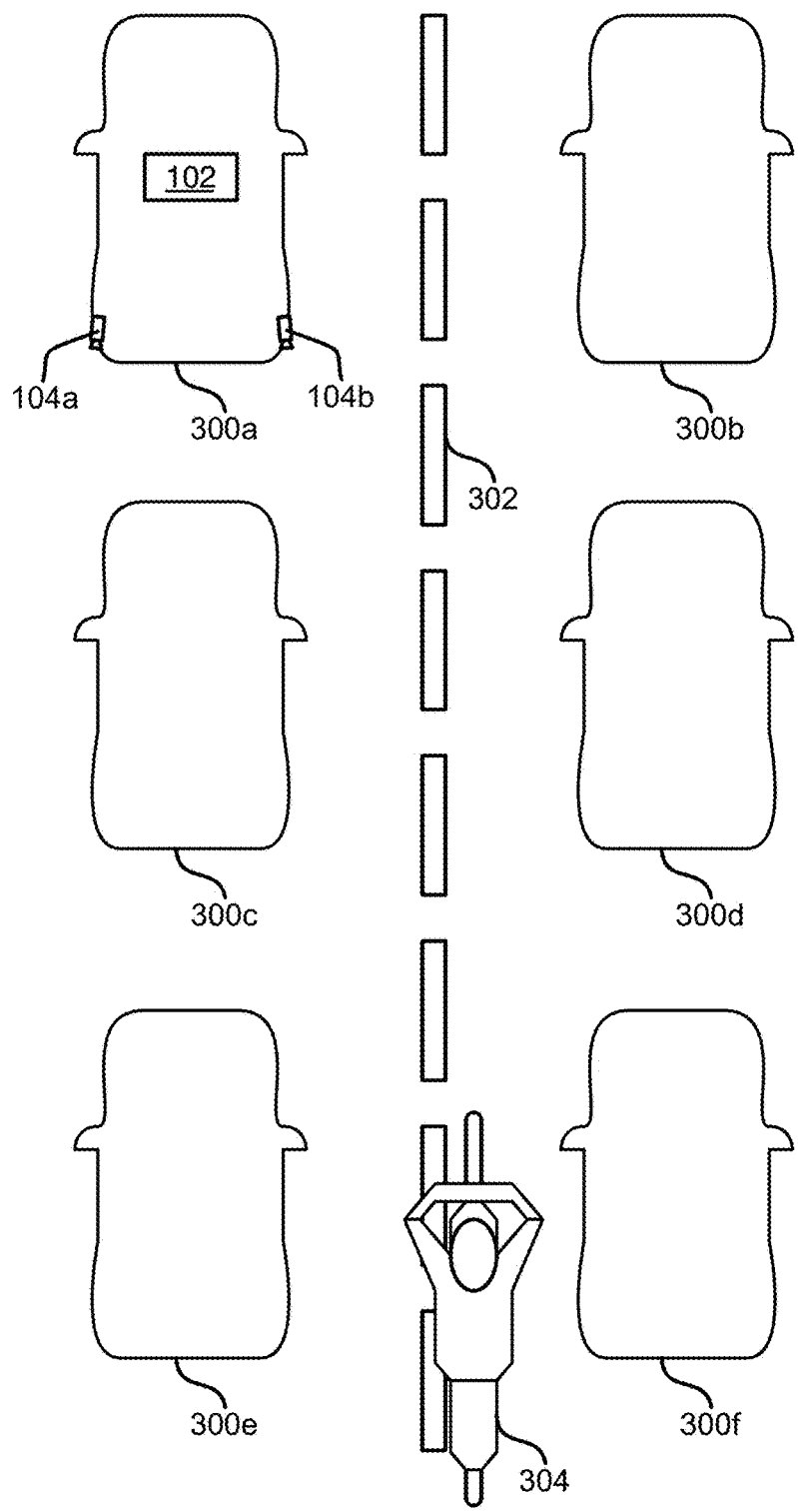
FIG. 3 is a schematic diagram illustrating an autonomous vehicle in traffic including a lane-splitting motorcyclist.

Turning now to FIG. 3, vehicles 300a-300f in multi-lane traffic may travel in lanes on either side of a dividing line 302 between the lanes A motorcyclist 304 may travel between the lanes, e.g. on or about the dividing line 302, hereinafter "the inter-lane region." The motorcyclist 304 will typically travel faster than the other vehicles 300a-300f and provides little time to react. Furthermore, where the vehicles 300a-300f are moving slowly, the gaps between them may be small and visibility behind each vehicle may be limited as a result.

In FIG. 3, vehicle 300a includes the controller 102 housed therein as well as imaging devices 104 mounted thereto. As shown, the imaging devices 104 may include one or more rear facing cameras 104a, 104b. The cameras 104a, 104b may be mounted to sides of the vehicle 300a, such as the rear panels of the vehicle, the rear or front doors of the vehicle, on the trunk of the vehicle, the roof of the vehicle, in a tail light assembly of the vehicle, or at some other location. The cameras 104a, 104b may have an optical axis that is angled (e.g. 1 to 10 degrees) relative to the longitudinal axis (front to back) of the vehicle 300a in order to ensure that an inter-lane region is in the field of view of each camera.

Figure 4:
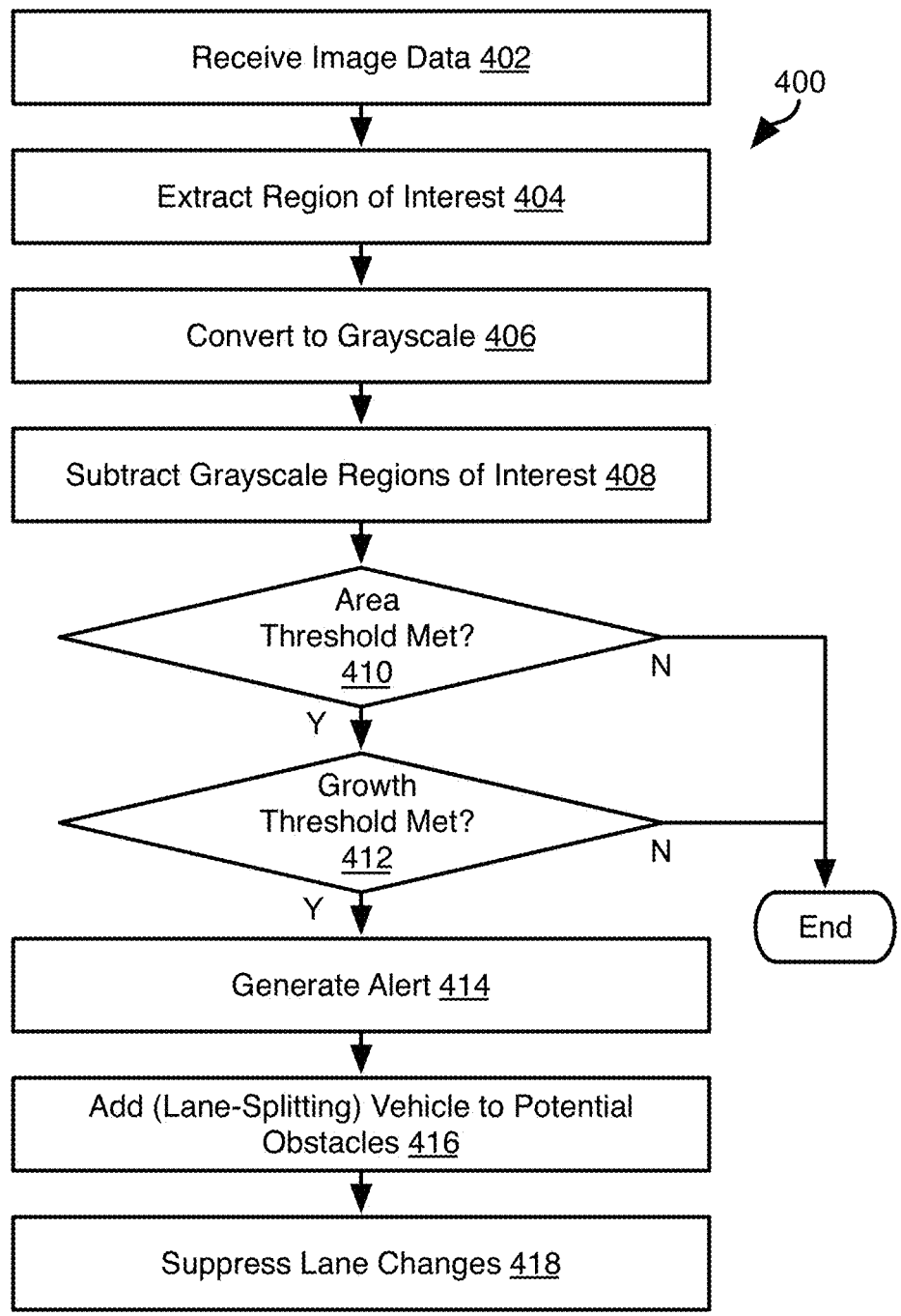
FIG. 4 is a process flow diagram of a method for detecting lane-splitting motorcyclists in accordance with an embodiment of the invention.

Referring to FIG. 4, the illustrated method 400 may be executed by the controller 102 in order to provide enhanced collision avoidance with respect to motorcyclists and other lane-splitting vehicles. For example, the illustrated method 400 may be executed by the collision avoidance module 108 and the lane-splitting module 110a thereof.

The method 400 may include receiving 402 image data, such as in the form of a stream of image frames from the cameras 104a, 104b. The image streams may be in the form of a video signal according to any video encoding and transmitting protocol known in the art. Alternatively, each image stream may simply be a series of individual images according to any image format known in the art received in the order in which they were taken by one of the cameras 104a, 104b.

The method 400 may include extracting 404 a region of interest from the image frames. The possible locations of a lane-splitting vehicle in the field of view of the cameras 104a, 104b may be particularly limited. Accordingly, for a given vehicle and a given mounting location of the cameras 104a, 104b, the region of interest for identifying potential lane-splitting vehicles may be identified experimentally in a variety of likely scenarios.

In use, the images received at step 402 may then be processed to extract pixel data from this region of interest for processing according to the subsequent steps of the method 400 or to otherwise restrict subsequent processing of the method 400 to this region of interest.

The method 400 may include converting 406 the region of interest in each image frame to grayscale. This may include applying the conversion to the entire image frame or just to the region of interest.

The original image frames may be color images or may already be grayscale images. In either case, step 406 may include converting the region of interest in each image frame to a grayscale image having a drastically reduced number of levels, e.g. less than 10 percent, preferably less than 5 percent, and more preferably less than 2 percent. For example, for an image frame having a possible 256 intensity levels, step 406 may include converting the pixels in the region of interest to one of 10, preferably less than 5, and more preferably only three levels (e.g., black, gray, and white).

For example, the 256 intensity levels may be divided into a high (255-170), middle, (169-85) and low region (85-0). Pixels having intensities in the high region may be assigned a high level (e.g., white), pixels having intensities in the middle region may be assigned a middle level (e.g., gray), and pixels having intensities in the low region may be assigned a low level (e.g., black). In this example, the range of possible intensities may be of substantially (e.g. within 1%) equal size. However, the regions may be of unequal size in other embodiments.

Where the input image frames are color images, these color images may first be converted to conventional grayscale images (e.g. 256 or more intensities), which are then converted to the grayscale images having the drastically reduced number of intensity levels.

The method 400 may further include subtracting 408 the grayscale region of interest of one image frame ("the current image") from the grayscale region of interest of a preceding image frame ("the reference image"). The image data may be received 402 as a sequence of image frames over time. The reference image may be an immediately preceding image frame in the sequence or may be offset from the current image in the sequence. For example, the reference image may correspond to a 0.1 to 0.5 second offset, preferably a 0.3 to 0.35 second offset. For example, with a frame rate of 60 Hz, a ⅓ second offset would include going back 20 frames to retrieve the reference frame. The reference image may be between 10 and 30 frames back from the current image, preferably between 16 and 24 frames back.

The regions of interest for the current and reference images may then be subtracted to obtain a difference image. Any non-zero pixels in the difference image indicate differences between the current and reference image. Due to the conversion at step 406, the amount of differences due to noise or slow variation between the images will be reduced and only significant changes will result in non-zero pixels. Significant changes indicate fast movement, which is helpful to detect lane-splitting vehicles that maybe moving much faster than surrounding traffic.

The method 400 may include evaluating 410 whether an area threshold is met by the difference image, e.g., whether a number or percentage of the pixels in the difference image that are non-zero exceeds a threshold number or percentage.

For example, a number of pixels that is at least 5 to 15 percentage of the pixels in the difference image may be determined 410 to meet the area threshold. In some embodiments, the threshold may vary by lighting conditions, e.g. decrease with decreasing ambient light levels. When it is dark, only headlights are visible such that a smaller number of non-zero pixels in the difference image will be found 410 to meet the threshold condition.

The method 400 may further include determining 412 whether growth of the area of non-zero pixels is occurring. When a lane-splitting vehicle is approaching, the area will grow as it occupies a larger portion of the field of view of the cameras 104a, 104b.

For example, growth may be determined 412 to be sufficient if the area of non-zero pixels in the difference image for at least N contiguous input frames increase moving forward in time through the sequence of input image frames. For example, N may be from 1 to 10, preferably from 5 to 10.

In some embodiments, whether the growth threshold is found 412 to be met may be conditioned on an amount of growth exceeding some minimum growth, e.g. growth of at least 1 to 5 percent growth in the number of non-zero pixels in the difference images for consecutive image frames or input image frames offset from one another by one or more (e.g. from 1 to 10) intervening frames.

If the conditions of both of steps 410 and 412 are found to be met, then various actions may be taken. Actions may include generating 414 an alert to the driver of the vehicle in the form of an audible tone, flashing light, text or image message on a display screen, or other human perceptible alert. Generating 414 an alert may include transmitting an alert to surrounding vehicles.

Actions may include adding 416 a potential lane-splitting vehicle to a set of potential obstacles. The set of potential obstacles may include other obstacles detected using the imaging devices 104 or any other sensors 106 using any algorithm known in the art. The controller 102 may then perform collision avoidance with respect to the obstacle set, which may include a likely lane-splitting motorcycle identified according to steps 402-412.

Actions may include suppressing 418, by the controller 102, lane changes, performing fewer lane changes, signaling longer prior to lane changes, performing lane changes more slowly, or otherwise driving differently than when a possible lane-splitting motorcycle is not detected. The actions of steps 418 may cease once a lane-splitting vehicle is no longer detected.

Figure 5A:
FIG. 5A illustrates an original image including a lane-splitting motorcyclist.
Figure 5B:
FIG. 5B illustrates a grayscale version of the original image in accordance with an embodiment of the present invention.

Referring to FIG. 5A, an original image frame or a grayscale conversion of an original image may be as illustrated. Upon reduction to the drastically reduced number of gray levels, the image may be as shown in FIG. 5B, which has only three levels (white, gray, and black)

Figure 6C:
FIGS. 6A to 6C are images illustrating the identification of a lane-splitting motorcycle in accordance with an embodiment of the present invention.
Figure 6B:
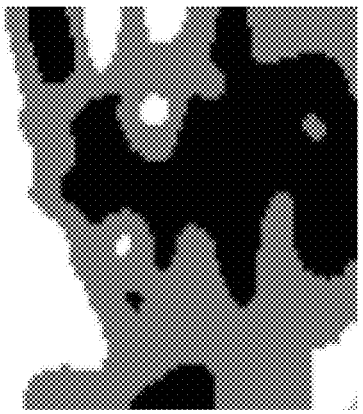
Figure 6A:

FIGS. 6A and 6B illustrate three-level grayscale versions of regions of interest of different image frames taken of a lane-splitting motorcycle. FIG. 6C illustrates the difference between the images of FIGS. 6A and 6B. As is readily apparent, the lane-splitting motorcycle shows up clearly as non-zero (white) areas of the image in FIG. 6C. The non-zero pixels are easily identified and evaluated to determine whether a fast-moving vehicle is present.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method comprising, by a vehicle controller:
converting a first image to a first grayscale image and a second image to a second grayscale image, the first and second grayscale images having a first number of intensity levels that is less than 10% of a second number of intensity levels of the first and second images; and
determining that a difference between the first grayscale image and the second grayscale image indicates a moving object.

2. The method of claim 1, further comprising:
receiving, by the vehicle controller, the first image and the second image from a rearwardly facing camera mounted to a vehicle and having an inter-lane region of the vehicle in a field of view of the rearwardly facing camera.

3. The method of claim 1, wherein converting the first image to the first grayscale image and converting the second image to the second grayscale image comprises processing only a region of interest within the first image and the second image that includes the inter-lane region.

4. The method of claim 1, wherein the first number of intensity levels is at least 256 and the second number of intensity levels is less than 10.

5. The method of claim 1, wherein the first number of intensity levels is at least 255 and the second number of intensity levels is three.

6. The method of claim 1, further comprising:
receiving, by the vehicle controller, the first image and the second image from a rearwardly facing camera mounted to a vehicle as part of a sequence of images over time;
wherein the first image is offset from the second image by between 0.3 and 0.35 seconds.

7. The method of claim 1, further comprising:
receiving, by the vehicle controller, the first image and the second image from a rearwardly facing camera mounted to a vehicle as a sequence of images over time;
wherein the first image is offset from the second image in the sequence by between 16 and 24 frames.

8. The method of claim 1, further comprising determining that the difference between the first grayscale image and the second grayscale image indicates the fast moving object comprises:
generating a difference image that is a difference between a region of interest of the first grayscale image and a region of interest of the second grayscale image; and
determining that a number of non-zero pixels of the difference image exceeds a threshold.

9. The method of claim 1, wherein determining that the difference between the first grayscale image and the second grayscale image indicates the fast moving object comprises:
generating a first difference image that is a difference between a region of interest of the first grayscale image and a region of interest of the second grayscale image; and
converting a third image to a third grayscale image;
after generating the first difference image, generating a second difference image that is a difference between a region of interest of the third grayscale image and at least one of the first grayscale image, the second grayscale image, and a different grayscale image;
determining that (a) a second number of non-zero pixels in the second difference image is greater than a first number of non-zero pixels in the first difference image and (b) that a number of non-zero pixels in at least one of the first difference image and the second difference image meets a size threshold.

10. The method of claim 1, further comprising:
in response to determining that the difference between the first grayscale image and the second grayscale image indicates a fast moving object performing, by the controller, at least one of:
generating a user perceptible alert; and
suppressing one or more lane changes.

11. A vehicle comprising:
a vehicle body;
one or more rearwardly facing cameras mounted to the vehicle body;
a controller mounted in the vehicle and programmed to—
receive a first image from the one or more rearwardly facing cameras;
receive a second image from the one or more rearwardly facing cameras after the first image;
convert the first image to a first grayscale image;
convert the second image to a second grayscale image, the first and second grayscale images having a first number of intensity levels that is less than 10 percent of a second number of intensity levels of the first and second images; and
determine that a difference between the first grayscale image and the second grayscale image indicates a moving object.

12. The vehicle of claim 11, wherein the one or more rearwardly facing cameras have an inter-lane region of the vehicle in a field of view of the rearwardly facing camera.

13. The vehicle of claim 11, wherein the controller is further programmed to convert the first image to the first grayscale image and convert the second image to the second grayscale image by processing only a region of interest within the first image and the second image, the region of interest including the inter-lane region.

14. The vehicle of claim 11, wherein the first number of intensity levels is at least 255 and the second number of intensity levels is less than 10.

15. The vehicle of claim 11, wherein the first number of intensity levels is at least 255 and the second number of intensity levels is three.

16. The vehicle of claim 11, wherein the controller is further programmed to:
receive the first image and the second image as part of a sequence of images over time;
wherein the first image is offset from the second image by between 0.3 and 0.35 seconds.

17. The vehicle of claim 11, wherein the controller is further programmed to:
receive the first image and the second image as part of a sequence of images over time;
wherein the first image is offset from the second image in the sequence by between 16 and 24 frames.

18. The vehicle of claim 11, wherein the controller is further programmed to:
generate a difference image that is a difference between a region of interest of the first grayscale image and a region of interest of the second grayscale image; and
if a number of non-zero pixels of the difference image exceeds a threshold, determine that the first grayscale image and second grayscale image indicate a moving object.

19. The vehicle of claim 11, wherein the controller is further programmed to, for a sequence of images including the first image and the second image:
convert each image to a current grayscale image;
generate a difference image by comparing the current grayscale image and a grayscale image for a preceding image of the sequence of images;
determine an amount of non-zero pixels in the difference image;
if the amount of non-zero pixels in the difference image is greater than a number of non-zero pixels in the difference image for a preceding image in the sequence of images, determine that the first grayscale image and the second grayscale image indicate movement.

20. The vehicle of claim 11, wherein the vehicle controller is further programmed to:
if the difference between the first grayscale image and the second grayscale image indicates a fast moving object perform at least one of:
generating a user perceptible alert; and
suppressing one or more lane changes.

* * * * *